United States Patent [19]

Mizukami et al.

[11] Patent Number: 5,473,023
[45] Date of Patent: Dec. 5, 1995

[54] HIGHLY WATER-ABSORPTIVE FIBER

[75] Inventors: Yoshikatsu Mizukami, Osaka; Tsutomu Teshima; Katsumi Agari, both of Houfu; Yutaka Tanaka, Osaka; Hiroko Fukumoto, Houfu; Miyako Kakegawa, Houfu; Hiroko Yoshimura, Houfu, all of Japan

[73] Assignee: Kanebo, Ltd., Tokyo, Japan

[21] Appl. No.: 211,744

[22] PCT Filed: Aug. 18, 1993

[86] PCT No.: PCT/JP93/01153

§ 371 Date: Apr. 13, 1994

§ 102(e) Date: Apr. 13, 1994

[87] PCT Pub. No.: WO94/04725

PCT Pub. Date: Mar. 3, 1994

[30] Foreign Application Priority Data

Aug. 19, 1992 [JP] Japan ................................. 4-244247
Jan. 9, 1993 [JP] Japan ................................. 5-018043

[51] Int. Cl.$^6$ .................................................. C08F 8/42
[52] U.S. Cl. ........................... 525/329.2; 525/330.2; 525/330.6; 525/363
[58] Field of Search ..................... 525/329.2, 330.2, 525/330.6

[56] References Cited

U.S. PATENT DOCUMENTS

| | | | |
|---|---|---|---|
| 4,090,013 | 5/1978 | Ganslaw et al. | 525/363 |
| 4,185,831 | 1/1980 | Tominaga | 525/363 |
| 4,517,330 | 5/1985 | Zdanowski et al. | 525/363 |
| 4,604,420 | 8/1986 | Sato | 525/363 |
| 4,990,574 | 2/1991 | Yamada | 525/363 |

FOREIGN PATENT DOCUMENTS 1-183515 7/1989 Japan.

Primary Examiner—Bernard Lipman
Attorney, Agent, or Firm—Flynn, Thiel, Boutell & Tanis

[57] ABSTRACT

A highly water-absorptive fiber formed of a copolymer containing:
(a) polymer units from a vinyl monomer having a carboxyl group, some of the carboxyl groups of the polymer units being converted to a Na salt and/or K salt, and
(b) polymer units from monomers such as a vinyl monomer having an amino group and a vinyl monomer having a hydroxyl group and an amino group. This highly water-absorptive fiber has high water absorption properties, has almost free from coloring, is excellent physiological saline solution absorption properties and can be produced under usual carding and spinning conditions.

2 Claims, No Drawings

HIGHLY WATER-ABSORPTIVE FIBER

TECHNICAL FIELD

The present invention relates to a highly water-absorptive fiber. More specifically, it relates to a highly water-absorptive fiber suitable for use in the field of industrial materials required to have high water absorption properties such as sealing materials.

TECHNICAL BACKGROUND

Japanese Laid-open Patent Publication No. 183515/1989 discloses a highly water-absorptive fiber obtained by imparting an acryl fiber with high water absorption properties by the hydrolysis of the acryl fiber.

However, the defect is that when an acryl fiber is hydrolyzed, the fiber colors or that the percentage of physiological saline solution absoprtion decreases to about a half of the percentage of pure water absorption.

Japanese Laid-open Patent Publication No. 159405/1988 discloses a fiber formed of a copolymer which is produced from a vinyl monomer having a carboxylic acid group and a vinyl monomer having a hydroxyl group reactive with a carboxylic acid group and in which some of the carboxylic acid groups is converted to sodium salt. In this fiber, the percentage of physiological saline solution absorption does not decrease much as it is about ⅔ of the percentage of pure water absorption. However, the crosslinking reaction between the hydroxyl group and the carboxyl group proceeds slowly, and it is required to carry out the crosslinking reaction at a temparture of 180° C. or higher, which increases the cost.

DISCLOSURE OF THE INVENTION

It is an object of the present invention to provide a novel highly water-absorptive fiber.

It is another object of the present invention to provide a highly water-absorptive fiber, which has high water absorption properties, is almost free from coloring, has excellent properties of absorbing a physiological saline solution, has excellent carding and spinning properties and inexpensive.

Other objects and advantages of the present invention will be apparent from the following description.

According to the present invention, the above objects and advantages of the present invention will be achieved, first, by a highly water-absorptive fiber (to be referred to as "first highly water-absorptive fiber" of the present invention hereinafter) formed of a copolymer containing:

(a) polymer units from a vinyl monomer having a carboxyl group, some of the carboxyl groups of the polymer units being converted to Na salt and/or K salt, and (b) polymer units from at least one monomer selected from the group consisting of a vinyl monomer having an amino group and a vinyl monomer having a hydroxyl group and an amino group.

According to the present invention, the above objects and advantages of the present invention will be achieved, second, by a highly water-absorptive fiber (to be referred to as "second highly water-absorptive fiber" of the present invention hereinafter) formed of a copolymer containing:

(a) polymer units from a vinyl monomer having a carboxyl group, some of the carboxyl groups of the polymer units being converted to Na salt and/or K salt, and (b) polymer units from a vinyl monomer having an amino group and polymer units from a vinyl monomer having a hydroxyl group.

According to the present invention, the above objects and advantages of the present invention will be achieved, third, by a highly water-absorptive fiber (to be referred to as "third highly water-absorptive fiber" of the present invention hereinafter) formed of a copolymer containing:

(a) polymer units from a vinyl monomer having a carboxyl group, some of carboxyl groups of the polymer units being converted to Na salt and/or K salt, and (b) polymer units from a vinyl monomer having an amino group, polymer units from a vinyl monomer having a hydroxyl group and polymer units from a vinyl monomer having a hydroxyl group and an amino group.

According to the present invention, the above objects and advantages of the present invention will be achieved, fourth, by a highly water-absorptive fiber (To be referred to as "fourth highly water-absorptive fiber" of the present invention hereinafter) formed of a copolymer containing:

(a) polymer units from a vinyl monomer having a carboxyl group, some of carboxyl groups of the polymer units being converted to Na salt and/or K salt, and (b) polymer units from a vinyl monomer having a hydroxyl group and polymer units from a vinyl monomer having an amino group and a hydroxyl group.

According to the present invention, the above objects and advantages of the present invention will be achieved, fifth, by a highly water-absorptive fiber (to be referred to as "fifth highly water-absorptive fiber" of the present invention hereinafter) formed of a copolymer containing:

(a) polymer units from a vinyl monomer having a carboxyl group, some of the carboxyl groups of the polymer units being converted to zinc salt and also converted to Na salt and/or K salt, and (b) polymer units from a vinyl monomer having a hydroxyl group.

DETAILED DESCRIPTION OF THE INVENTION

First, the first to fourth highly water-absorptive fiber of the present invention will be described.

The polymer units (a) From a vinyl monomer having a carboxyl group are formed, for example, by the vinyl-polymerization of a vinyl monomer such as acrylic acid, methacrylic acid or maleic acid. These vinyl monomers may be used alone or in combination.

In some of the vinyl monomers having a carboxyl group, preferably, the carboxyl group is converted to zinc salt. More preferred is a vinyl monomer having a carboxyl group, some of the carboxyl groups of which are converted to a zinc salt and a Na salt or to a zinc salt and a K salt.

The zinc salt of the vinyl monomer having a carboxyl group can be obtained by reacting a vinyl monomer having a carboxyl group with zinc hydroxide on an acidic side at a low temperature. When the reaction temperature exceeds 30° C., undesirably, the polymerization partially starts. The content of the polymer units from this zinc salt in the copolymer is preferably at least 5 mol %.

The polymer units in which some of the carboxyl groups are converted to the above salt can be also formed in the copolymer by reacting a zinc salt such as zinc chloride with a carboxyl group, or by carrying out ion exchange with another metal salt, after the copolymerization.

In the Na salt and/or K salt of the polymer units from the vinyl monomer having a carboxyl group, the content of at least one of these in the copolymer is preferably 15 to 30 mol %. When the content of these salts is too large, the polymer excessively shows moisture absorption properties.

The content of the polymer units from the vinyl monomer having a carboxyl group (including those converted to salt) in the copolymer is preferably 80 to 98 mol %, more preferably 90 to 97 mol %.

The other polymer units (b) forming the copolymer are classified into the following four types of units.

In the first fiber of the present invention, the other polymer units are polymer units from at least one monomer selected from the group consisting of a vinyl monomer having an amino group and a vinyl monomer having a hydroxyl group and an amino group.

In the second fiber of the present invention, the other polymer units are polymer units from a vinyl monomer having an amino group and polymer units from a vinyl monomer having a hydroxyl group.

In the third fiber of the present invention, the other polymer units are polymer units from a vinyl monomer having an amino group, polymer units from a vinyl monomer having a hydroxyl group and polymer units from a vinyl monomer having an amino group and a hydroxyl group.

In the fourth fiber of the present invention, the other polymer units are polymer units from a vinyl monomer having a hydroxyl group and polymer units from a vinyl monomer having an amino group and a hydroxyl group.

As the vinyl monomer having an amino group which can react with a carboxyl group, for example, dimethyl aminoethylacrylate and diethyl aminopropylacrylate are preferred.

As the vinyl monomer having a hydroxyl group and an amino group which can react with a carboxyl group, for example, 3-(diethylamino)-2-hydroxypropylacrylate is preferred.

An amino group is preferred, since it is more reactive with a carboxyl group than a hydroxyl group and easily undergoes crosslinking.

The above monomers having a group which can react with a carboxyl group may be used alone or in combination.

The content of the polymer units from the above vinyl monomer having a group reactive with a carboxyl group in the copolymer is preferably at least 3 mol %, more preferably at least 5 mol %. Further, when the content of polymer units from a vinyl monomer having a free carboxyl group is less than 10 mol % or when the content of the polymer units from the above vinyl monomer having a group reactive with a carboxyl group is less than 3 mol %, the amount of crosslinked structure is small, and the water-insolubility is liable to be insufficient.

In addition to the above polymer units (a) and (b), the above copolymers used in the present invention may contain 20 mol % or less of polymer units from another vinyl monomer for decreasing the cost and improving the physical properties.

The fifth highly water-absorptive fiber of the present invention will be described hereinafter.

It should be understood that the descriptions of the first to fourth highly water-absorptive fibers of the present invention can be applied to the fifth highly water-absorptive fiber if the description of the fifth highly water-absorptive fiber is omitted.

In the fifth highly water-absorptive fiber, some of the polymer units from the vinyl monomer having a carboxyl group are converted to a zinc salt and also converted to a Na salt and/or K salt. When a zinc salt is present and when the crosslinking degree is proper, the water absorption properties can be maintained and the moisture absorption properties can be decreased, which is advantageous for carding and spinning.

The method of producing the copolymers used for the first to fifth highly water-absorptive fibers of the present invention is not specially limited, and a general solution polymerization method can be used. Any one of batch polymerization and continuous polymerization may be employed. The polymerization initiator can be selected from ordinary peroxides, azo compounds, persulfates and the like. Auxiliary materials such as a polymerization stabilizer and a coloring preventer may be used. In the solution polymerization, for example, water is used as a solvent. After the polymerization, it is preferred to carry out a viscosity adjustment.

For producing the first to fifth fibers of the present invention from the above copolymers, a dry spinning method is preferred as the spinning method. In a wet spinning method, the agglutination among fibers is liable to occur during drying. The copolymers are dry-spun by a conventional method to form a fiber, and then, the fiber is optionally drawn and crosslinked by a dry-heating treatment. The dry-heating treatment may be carried out around 80° C. if the treatment time is increased. Practically, the dry-heating treatment is advantageously carried out at 120° C. or higher. The treatment time is preferably at least 1 minute, more preferably at least 2 minutes.

After the crosslinking treatment, the fiber is crimped and cut as required.

The first to fifth highly water-absorptive fibers of the present invention have high water-absorption properties, are almost free from coloring, excellent in physiological saline solution absorption, and can be produced under usual carding and spinning conditions. The highly water-absorptive fibers of the present invention can be used alone, and in mixtures with other fibers.

EXAMPLES

The present invention will be further detailed with reference to the Examples. In the Examples, "%" used for showing composition amounts for polymerization stands for "mol %", and "%" used in other places stands for "% by weight", unless otherwise specified.

The water absorption percentage of a fiber was measured according to DIN 53814. The tensile strength and extension percentage of a fiber were measured according to JIS L 1015. The moisture absorption percentage is measured by allowing a fiber to stand at 20° C. at 60% RH for 24 hours. A fiber was measured for a metal content by a fluorescent X-ray method.

Examples 1–10 and Comparative Examples 1 and 2

The water-based solution polymerizations of the monomer compositions shown in Table 1 were carried out in the presence of potassium persulfate as a polymerization initiator and potassium carbonate as an auxiliary at a total monomer concentration of 10% at 50° C. for 2 hours. All the polymerization degrees of the obtained polymers were 90% or more. The polymers were dry-spun by a conventional method, and the spun fibers were drawn 3 times and heat treated under tension at 120° C. for 1 minute to give 3-denier fibers. Table 2 shows the water absorption percentages of the so-obtained fibers to a physiological saline solution and the mechanical properties thereof.

Table 1

TABLE 1

| Example No. | Composition amount for polymerization (mol %) | | | | |
|---|---|---|---|---|---|
| | Acrylic acid | 2-Hydroxy-propyl acrylate | Na salt of acrylic acid | Zn salt of acrylic acid | Dimethyl-aminoethyl acrylate |
| 1 | 67 | 3 | 20 | 10 | — |
| 2 | 65 | 5 | 20 | 10 | — |
| 3 | 55 | 10 | 30 | 5 | — |
| 4 | 70 | 5 | 15 | 10 | — |
| 5 | 10 | 3 | 30 | 57 | — |
| 6 | 8 | 3 | 25 | 64 | — |
| 7 | 10 | 2 | 25 | 63 | — |
| 8 | 67 | 15 | 15 | 3 | — |
| 9 | 20 | 5 | 70 | — | 5 |
| 10 | 20 | — | 70 | — | 10 |
| Comparative Example 1 | 20 | — | 80 | — | — |
| Comparative Example 2 | 20 | 5 | 75 | — | — |

TABLE 2

| Example No. | Water absorption percentage (%) | Strength (gr/d) | Extension percentage (%) | Moisture absorption percentage (%) |
|---|---|---|---|---|
| 1 | 1,250 | 1.5 | 10.5 | 15.3 |
| 2 | 1,210 | 1.8 | 8.6 | 12.9 |
| 3 | 1,390 | 1.5 | 9.6 | 18.3 |
| 4 | 1,070 | 1.1 | 9.2 | 9.7 |
| 5 | 1,420 | 1.5 | 8.8 | 16.2 |
| 6 | 1,380 | 0.8 | 8.1 | 25.9 |
| 7 | 1,390 | 0.7 | 6.5 | 28.1 |
| 8 | 1,060 | 1.4 | 10.3 | 29.1 |
| 9 | 1,450 | 0.7 | 10.4 | 28.3 |
| 10 | 1,470 | 0.9 | 13.5 | 27.7 |

The fibers were obtained in Comparative Examples 1 and 2 dissolved in water due to their low cross-linking degrees.

Example 11

A 3-denier fiber was obtained in the same manner as in Example 1 except that 3 mol % of 2-hydroxypropyl acrylate was replaced with 3 mol % of 3-(diethylamino)-2-hydroxypropyl acrylate. The so-obtained fiber showed a water absorption of 1,180%, a strength of 1.6 gr/d, an extension percentage of 11.0% and a moisture absorption of 14.8%.

Example 12

A 3-denier fiber was obtained in the same manner as in Example 1 except that 3 mol % of 2-hydroxypropyl acrylate was replaced with 2 mol % of 3-(dimethylamino)-2-hydroxypropyl acrylate and 2 mol % of dimethylaminoethyl acrylate. The so-obtained fiber showed a absorption of 1,190%, a strength of 1.6 gr/d, an extension percentage of 11.3% and a moisture absorption of 14.3%.

Example 13

A 3-denier fiber was obtained in the same manner as in Example 1 except that -3 mol % of 2-hydroxypropyl acrylate was replaced with 1 mol % of 2-hydroxypropyl acrylate, 1 mol % of dimethylaminoethyl acrylate and 1 mol % of 3-(diethylamino)-2-hydroxypropyl acrylate. The so-obtained fiber showed a water absorption of 1,120% a strength of 1.5 gr/d, an extension percentage of 10.7% and a moisture absorption of 14.2%.

Example 14

A 3-denier fiber was obtained in the same manner as in Example 1 except that 3 mol % of 2-hydroxypropyl acrylate was replaced with 1 mol % of 3-(dimethylamino) -2-hydroxypropyl acrylate and 2 mol % of 2-hydroxypropyl acrylate. The so-obtained fiber showed a water absorption of 1,130%, a strength of 1.6 gr/d, an extension percentage of 11.2% and a moisture absorption of 14.9%.

Example 15

A 3-denier fiber was obtained in the same manner as in Example 1 except that the Na salt was replaced by a K salt. The so-obtained fiber showed a water absorption of 1,240%, a strength of 1.6 gr/d, an extension percentage of 11.2% and a moisture absorption of 16.1%

Example 16

A 3-denier fiber was obtained in the same manner as in Example 1 except that ½ (mol %) of the Na salt was replaced by a K salt. The so-obtained fiber showed a water absorption of 1,210% a strength of 1.6 gr/d, an extension percentage of 10.8% and a moisture absorption of 15.7%.

We claim:

1. A highly water-absorptive fiber formed of a copolymer containing:

(a) polymer units from a vinyl monomer having a carboxyl group, some of the carboxyl groups of the polymer units being converted to a zinc salt and at least one member selected from the group consisting of a Na salt and a K salt, and (b) polymer units from a vinyl monomer having a hydroxyl group.

2. The highly water-absorptive fiber of claim 1, wherein the vinyl monomer having a carboxyl group is at least one monomer selected from the group consisting of acrylic acid, methacrylic acid and maleic acid.

* * * * *